Patented Dec. 26, 1944

2,366,047

UNITED STATES PATENT OFFICE 2,366,047

PROCESS OF COATING A PIGMENT AND COATING COMPOSITION CONTAINING THE TREATED PIGMENT

Ludwig Francis Nerlinger, Marshallton, Del., assignor to E. I. du Pont de Nemours & Company, Wilmington, Del., a corporation of Delaware No Drawing. Application April 14, 1943, Serial No. 483,058

18 Claims. (Cl. 106—124)

This invention relates to the manufacture of improved pigment substances, and more particularly to the treatment of pigments to improve their hiding power and other essential properties.

More specifically, the invention relates to the treatment of previously calcined prime white pigments as well as extended forms thereof, with a minor amount of a colloidal earth such as bentonite, to improve the dry flat hiding power of such pigments and to obtain a product more amenable to use in all types of aqueous paint systems, especially in emulsion paints or cellulosic or paper coating compositions.

Pigmenting substances, such as prime white or colored pigments, are used in many commercial applications but are most generally employed in coating composition formulations, such as paints, enamels, lacquers, etc. The value of a particular pigment or pigmented coating composition depends, other properties being equal, upon the hiding power which the pigment or composition exhibits. Hiding power may be increased or augmented in a variety of ways. For example, a pigment having a higher refractive index may be used or the proportion or concentration of prime or base pigment in the composition may be increased. This latter is accomplished at the expense of the extender content of the formulations, extenders such as alkaline earth metal sulfates or carbonates being conventionally used in coatings, especially those designed for flat or matte finishes. However, substitution of a prime pigment for a less costly extender, or substituting prime pigments of higher refractive index increases to an objectionable extent the cost of the composition, and, in some ranges of hiding power and pigment binder ratios, amounts to an inordinate increase in comparison to the improvement obtained in hiding power.

A real need therefore has existed for a pigment-treating process adapted to provide a marked increase in pigment hiding power without any increase in or sacrifice of the prime pigment used in the coating formulation, as well as for a commercial process from which a pigment or composition containing the same, exhibiting maximum hiding power at minimum cost, can be readily obtained. Previously this has been unattainable and, since it results from a practice of my invention, this comprises one of my principal and primary objects. Additional objects include: the production of a novel treated pigment possessing improved, excellent dispersion characteristics upon employment in coating composition vehicles, together with improved working and spreading qualities when the coating is applied to particular surfaces; the production of a pigment having improved, markedly increased surface and flat hiding power characteristics over those possessed by prior but untreated forms of pigments; and to increase the opacifying power of the coating composition. Other objects will be apparent from the ensuing description of my invention.

These and other objects are attainable in this invention which comprises intimately associating a minor amount of a colloidal bentonite earth, particularly montmorillonite-containing bentonite, with a pigment substance or a coating composition containing such pigment.

In a more specific and preferred embodiment, the invention comprises commingling or otherwise associating with a previously-calcined white, inorganic pigment, preferably a zinc sulfide-containing product, from about 3% to 40%, on the weight of the pigment, of water-swelling montmorillonite-containing bentonite, and then employing the resulting product as an essential pigment ingredient of a wall-board coating composition.

One practical and preferred adaptation of the invention now will be described wherein I subject a previously calcined pigment to treatment with bentonite and then employ the resulting product as a pigmenting substance in a wall-board coating finish containing a water-compatible binder. As is known, wall-board compositions are usually made up of either collulosic or inorganic types of materials, such as gypsum, the board, in uncoated state, being dull brown or dull gray in color. To improve its appearance and increase its utility, a pigmented coating composition is applied to one or both sides of the dry or wet board. In some instances this serves as a prime coat, while in others application of the coating is designed to obviate painting the fabricated wall after board installation. Coating the board is usually effected by means of conventional spray equipment or by means of a doctor blade or a roller device. The resulting coated surface is usually flat or relatively low in angular sheen.

In accordance with my invention, I effect the intimate association of a relatively small amount, say, at least 3%, and preferably from about 6% to about 20%, by weight, of a swelling type of bentonite with a prime white pigment, such as lithopone, to be used in the coating. Conveniently, this is brought about by suitably commingling the bentonite, in either dry or wet state, with the calcined pigment, following which the mixture is dried and ground in a conventional milling device, such as a disintegrator, roller or hammer type mill, in order to promote more intimate contact and association of the pigment particles with the bentonite. If desired, the bentonite may be mixed in the dry condition with the dry pigment, followed by dry milling of the mixture. The bentonite-treated pigment which results may be then suitably mixed with a proteinaceous binder, such as casein or soya protein, or other binders such as starch, glue, etc., and the resulting composition can then be applied to a wall-board material in the manners already indicated.

By reason of treatment in accordance with my invention of a prime pigment or coating composition containing the same, a coating composition will result exhibiting a pronounced, commercially important increase in dry flat hiding power over prior compositions which do not contain bentonite-treated forms of pigmenting substances.

To a more complete understanding of the invention, the following specific examples are given, these being merely in illustration and not in limitation of the invention:

EXAMPLE I

Aqueous proteinaceous wallboard coating composition vehicles were prepared in accordance with the following formulae. In each instance the order as listed represents the order of addition to the mixing vessel and the proportions given are parts by weight:

| Vehicle #1 | | Vehicle #2 | |
|---|---|---|---|
| Water at 140° F | 2,200 | Water at 140° F | 1,800 |
| Caustic soda | 5 | Alpha protein | 200 |
| Casein | 180 | Caustic soda (syrupy) | |
| Glycerine | 20 | Water to make total | 2,100 |

Using the above vehicle #1, the following wallboard coating compositions were prepared, by admixing the ingredients shown in formulations A and B below, the proportions in each instance representing parts by weight:

| Formulation A | | Formulation B | |
|---|---|---|---|
| Vehicle #1 | 2,200 | Vehicle #1 | 2,200 |
| Commercial high-flat lithopone | 750 | Commercial lithopone | 750 |
| Diatomaceous silica | 75 | Diatomaceous silica | 75 |
| Paraformaldehyde | 14 | Paraformaldehyde | 14 |

Formulation C

| | |
|---|---|
| Vehicle #1 | 2,200 |
| Commercial high flat hiding lith.-bentonite composition | 750 |
| Diatomaceous silica | 75 |
| Paraformaldehyde | 14 |
| Water [1] | 1,250 |

[1] Extra water was required to reduce consistency to that of Formulation A.

The commercial high flat hiding lithopone of Formulation A was made up from a normal, treated type of lithopone upon which had been precipitated a minor amount of a metal silicate, in accordance with the disclosure of U. S. patent to M. L. Hanahan No. 2,296,639, dated September 22, 1942, to improve its properties. The lithopone used in Formulation B comprised a normal, untreated type of commercial lithopone.

The lithopone-bentonite composition of Formulation C consisted of 682 parts by weight of lithopone mixed, in the dry state, with 68 parts by weight of swelling type bentonite and then dry ground in a hammer type of mill.

In order to determine the relative hiding power of each of the three coating compositions, the relative surface areas per unit weight of pigment solids were measured at equal hiding power as follows:

Light buff-colored wallboard panels about 9" x 12" x ¾" were striped on one side with India ink. The stripes were uniformly ¼" in width and 2" apart.

The coating composition of Formula A was applied evenly and uniformly to the wall board by brushing, to nearly complete dry hiding. The spreading rate or surface area covered per unit weight of pigment solids was determined and may be considered as an arbitrary standard.

In similar manner coating compositions of Formulas B and C were applied to the same type of wall board and in sufficient amount to obtain equal dry flat hiding, the latter being readily determined visually. As in the instance of Formula A, the spreading rate or surface area covered per unit weight of pigment solids was also noted for comparative purposes.

The relative dry flat hiding power per unit weight of pigment solids may be calculated as follows:

$$\frac{\text{Candidate spreading rate in sq. ft./lb. pigment solids}}{\text{Standard spreading rate in sq. ft./lb. pigment solids}} =$$

Relative dry flat hiding power of the candidate

Determined in this manner, the relative dry flat hiding power of Formulation A was considered to be equal to 100%, whereas the relative dry flat hiding power of Formulation B was 60% and that of Formulation C, 140%.

It will be noted that despite the substitution of low cost swelling type bentonite for the more costly prime pigment, the composition of Formulation C had 140% greater value as a wallboard coating composition than Formulation A, or 233% greater than Formulation B, and that this was achieved without sacrifice in color and other critical properties of the wallboard coating.

EXAMPLE II

As in the instance of Example I, the following wall board coatings were prepared, employing Vehicle #2 of said Example I, the indicated parts in each instance being by weight:

| Formulation D | | Formulation E | |
|---|---|---|---|
| Vehicle #2 | 2,300 | Vehicle #2 | 2,300 |
| Titanium dioxide | 330 | Titanium dioxide | 330 |
| Lithopone | 600 | Lithopone-bentonite composition | 660 |
| Diatomaceous silica | 110 | Diatomaceous silica | 110 |
| Paraformaldehyde | 16 | Paraformaldehyde | 16 |
| | | Water | 1,050 |

The lithopone-bentonite composition of Formulation E consisted of the same normal commercial type lithopone as employed in Formulation D but had been intimately mixed with swelling type bentonite in the ratio of 600 parts by weight of pigment to 60 parts by weight of bentonite.

After applying the coating compositions to wall boards, relative dry flat hiding power values were determined in accordance with the methods referred to in Example I. The coating composition E, containing swelling type bentonite, showed 125% as great relative dry flat hiding power as for Formulation D. Again, the relative dry flat hiding power showed a marked increase despite the substitution of bentonite for a part of the base or prime white pigment.

EXAMPLE III

Additional wall board coating compositions, in accordance with the following formulations (wherein the figures given represent parts by weight), were made up and applied to boards as in Example I:

| Formulation F | | Formulation G | | Formulation H | |
|---|---|---|---|---|---|
| Vehicle #2 | 2,300 | Vehicle #2 | 2,300 | Vehicle #2 | 2,300 |
| Lithopone | 500 | Lithopone | 455 | Lithopone | 417 |
| Asbestine | 500 | Swelling type bentonite | 45 | Swelling type bentonite | 83 |
| | | Asbestine | 500 | Asbestine | 500 |

The relative dry flat hiding power of each composition was also determined as in Example I.

Formulation G showed a dry flat hiding power value 132% as great as Formulation F. Formulation H showed a dry flat hiding power value 145% as great as Formulation F.

Although above described as applied to certain specific and preferred embodiments, as indicated, the invention is not limited thereto, nor to the specific amounts, ratios or types of pigments mentioned. Similarly, it is not limited to the amounts of bentonite specified nor to the mentioned types of coating compositions or formulations. While lithopone, treated with a small amount of silica in accordance with the disclosure of said Hanahan patent, comprises a preferred prime white pigment for treatment in accordance with the invention and optimum benefits accrue hereunder as a result of its use, other lithopone pigments as well as other types of prime or extended pigments, or mixtures thereof, may be advantageously treated and with beneficial effects. Thus, examples of other previously calcined, white pigments include zinc sulfide, high zinc sulfide lithopones, lithopone, titanated lithopone, or titanium-containing pigments such as titanium oxide or various extended forms thereof. Useful types of pigment extenders include barium or calcium sulfates and carbonates, etc., or various silicates, especially magnesium silicate, etc.

The bentonite treating agent used herein comprises the clay mineral containing montmorillonite as its chief constituent, is a highly colloidal earth or gel-forming clay of the swelling type, and is highly water-absorptive. Preferably, I employ that type of bentonite the apparent volume of which, in contact with water, is at least about four times as great as the dry volume. This apparent volume in water may be conveniently measured as follows: 2.5 g. of air-dried swelling type bentonite, if not already −10-mesh, is comminuted to −10-mesh sieve size, and is added gradually to water present in a test tube or graduated cylinder. The apparent volume of the swelled sample is measured after 24 hours. The volume of water used should be more than sufficient for the absorption requirement of the bentonite.

The amounts of bentonite which I employ in my preferred wall board composition are variable, but preferably are relatively minor in character. To procure beneficial effects in such instances I resort to an amount of bentonite of at least 3% and up to about 40% by weight of the calcined pigment. A preferred, most useful concentration in obtaining optimum effects comprises the range from about 6% to about 20% by weight. Alternatively, and in those instances where the pigment is used in other types of aqueous coating systems, such as in resin emulsion, oil emulsion, casein or similar paints, amounts of bentonite as low as about 1% by weight may be used.

The bentonite may be added to the pigment in dry state, or it may be first mixed with water and then added to a slurry suspension of the pigment. If desired, admixture may be effected while both the treating agent and pigment are in relatively dry condition. Preferably, the amount of bentonite to be used in the treatment is mixed in the dry state with the pigment and the resulting mixture is then dry ground to effect intimate association of the bentonite particles with the pigment particles. Alternatively, the bentonite may be incorporated in the coating composition, comprising a prime white pigment and a proteinaceous binder. In the latter instances, bentonite admixture may be effected either before, during or after the pigment is mixed with the vehicle. While such mixing of the bentonite with the coating composition vehicle can be effected either before or after admixture of the vehicle and prior pigment, I find it more advantageous and therefore prefer to mix the bentonite and pigment together prior to incorporation of said pigment in the coating vehicle.

As already noted, I prefer to employ from about 6% to about 20% by weight of a swelling type bentonite with a prime pigment designed for use in an aqueous wall board coating composition. The pigment-bentonite mixture should show a distinct blue coloration upon addition of small amounts of tincture of benzidene. Considering that the color of bentonites is invariably poor in relation to the color of commercial white pigments, such as zinc sulfide and titanium oxide, it would appear that the incorporation of such relatively large proportions of bentonite into a pigment composition or a surface coating composition would result in a product of such poor color as to be non-useful for commercial purposes. However, such will not be found to be the case. I have found, for example, that incorporation of a swelling type of bentonite at a rate of 10% by weight on the prime pigment weight, as illustrated in Example I, produced wall board coatings fully equal in color to the coatings containing no bentonite. Furthermore, use of the contemplated bentonite treating agent will, as stated, advantageously promote a marked increase in inherent dry flat hiding power, far greater than that which the untreated pigment exhibits, and in most instances exerts a large increase in relative dry flat hiding power values.

I claim as my invention:

1. A process for treating pigment-useful substances to improve the flat hiding power of aqueous coating compositions containing the same which comprises intimately associating with a prime white pigment through milling treatment from about 1% to 40% by weight, on the pigment basis, of a colloidal swelling type bentonite earth containing montmorillonite as its chief constituent.

2. A process for treating pigment-useful substances to improve the flat hiding power of aqueous type coating compositions in which said pigment is incorporated, comprising intimately associating with a prime white pigment through milling treatment from about 3% to 40% by weight, on the pigment basis, of a colloidal, swelling type bentonite earth containing montmorillonite as its chief constituent.

3. A process for treating a previously-calcined, zinc sulfide-containing pigment to improve the flat hiding power of aqueous type coating compositions containing the same which comprises intimately associating with a previously-calcined zinc sulfide-containing pigment through milling treatment from about .3%–40% by weight, on the pigment basis, of montmorillonite-type bentonite.

4. A process for treating a previously calcined lithopone-containing pigment to improve the flat hiding power of aqueous type coating compositions containing the same, which comprises intimately associating with a previously-calcined lithopone-containing pigment through milling treatment from about 3%–40% by weight, on the pigment basis, of montmorillonite-type bentonite.

5. A process for treating previously-calcined, white, inorganic prime pigment substances to improve the flat hiding power of aqueous wall board coating compositions containing the same which comprises intimately associating with a previously-calcined white inorganic prime pigment through milling treatment from about 3% to 40% by weight, on the pigment basis, of a colloidal earth comprising montmorillonite-containing bentonite.

6. A process for treating a previously-calcined, prime white pigment to improve the flat hiding power of aqueous coating compositions containing said pigment, which comprises intimately associating with a previously-calcined prime white pigment through milling treatment at least 3% by weight, on the pigment basis, of a mineral clay containing montmorillonite as its chief constituent.

7. A process for treating previously calcined, white, inorganic prime pigment substances to improve the flat hiding power of aqueous wall board coating compositions containing the same, which comprises intimately associating with a previously-calcined white inorganic prime pigment through milling treatment from about 6% to 20% by weight, on the pigment basis, of a colloidal bentonite earth containing montmorillonite as its chief constituent.

8. A process for treating previously calcined, zinc, sulfide-containing pigments to improve the flat hiding power of aqueous wall board coating compositions containing the same which comprises intimately associating with a previously-calcined zinc sulfide-containing pigment through milling treatment from about 6% to 20% by weight, on the pigment basis, of a colloidal bentonite earth containing montmorillonite as its chief constituent.

9. A process for treating previously calcined, lithopone pigments to improve the flat hiding power of aqueous wall board coating compositions containing the same, which comprises intimately associating with a previously-calcined lithopone pigment through milling treatment from about 6% to 20% by weight, on the pigment basis, of a colloidal bentonite earth containing montmorillonite as its chief constituent.

10. A process for treating previously calcined, silica-treated lithopone pigments to improve the flat hiding power of aqueous wall board coating compositions containing the same, which comprises intimately associating with a previously-calcined silica-treated lithopone pigment through milling treatment from about 6% to 20% by weight, on the pigment basis, of a colloidal bentonite earth containing montmorillonite as its chief constituent.

11. A process for obtaining an aqueous coating composition exhibiting improved flat hiding power characteristics which comprises mixing a previously calcined, white, inorganic prime pigment substance with from about 6 to 20% by weight of colloidal, swelling-type bentonite earth containing montmorillonite as its chief constituent, milling the resulting mixture to more intimately associate the bentonite with the pigment, and then incorporating the resulting mixture in a coating composition vehicle, said percentage amount being based on the weight of the pigment being treated.

12. A process for obtaining an aqueous type coating composition exhibiting improved flat hiding power characteristics which comprises blending a previously-calcined, zinc sulfide-containing pigment with from about 3% to 40%, on the pigment basis, of bentonite containing montmorillonite as its chief constituent, milling the resulting mixture to more intimately associate the bentonite, and then incorporating the resulting mixture in the coating composition vehicle.

13. A process for obtaining an aqueous type wall board coating composition exhibiting improved flat hiding power characteristics which comprises mixing a lithopone pigment with from about 6% to 20% by weight, on the pigment basis, of colloidal bentonite containing montmorillonite as its chief constituent, milling the resulting mixture to more intimately associate the bentonite with said lithopone, and then incorporating the mixture in the coating composition vehicle.

14. A process for producing a pigmented wall board aqueous type coating composition exhibiting improved dry flat hiding power characteristics which comprises mixing with a previously-calcined lithopone pigment from about 6% to 20% on the pigment basis of colloidal bentonite containing montmorillonite as its chief constituent, milling the resulting mixture to more uniformly associate said bentonite with said pigment, and then incorporating the resulting mixture in a proteinaceous binder.

15. A process for producing a pigmented wall board aqueous type coating composition exhibiting improved dry flat hiding power characteristics, which comprises mixing with a silica-treated lithopone pigment from about 6% to 20% on the pigment basis of colloidal bentonite containing montmorillonite as its chief constituent, milling the resulting mixture to more uniformly associate said bentonite with said pigment, and then incorporating the resulting mixture in a proteinaceous binder.

16. An improved aqueous wall board coating composition containing a water-compatible binder, a prime white pigmenting substance, together with from about 3% to 40%, based on the weight of the pigment, of swelling type bentonite containing montmorillonite as its chief constituent as a treating agent for said pigment, said bentonite component having been intimately associated with the pigmenting substance by milling treatment prior to incorporation of the pigment in said coating composition.

17. An improved aqueous type wall board coating composition containing as essential ingredients a proteinaceous binder, lithopone, and from about 6% to 20%, based on the weight of the lithopone, of a colloidal bentonite earth containing montmorillonite as its chief constituent, said bentonite component having been intimately associated with the pigmenting substance by milling treatment prior to incorporation of the pigment in said coating composition.

18. An aqueous type coating composition exhibiting improved flat hiding power characteristics, comprising a coating vehicle, a prime white pigmenting substance for said vehicle, together with from 3-40%, based on the weight of the pigment, of swelling type, colloidal bentonite earth containing montmorillonite as its chief constituent, said bentonite having been intimately associated with said prime pigment through milling treatment prior to incorporation of said pigment in said coating composition.

LUDWIG FRANCIS NERLINGER.